United States Patent [19]

Deglise et al.

[11] Patent Number: 4,568,362
[45] Date of Patent: Feb. 4, 1986

[54] GASIFICATION METHOD AND APPARATUS FOR LIGNOCELLULOSIC PRODUCTS

[75] Inventors: Xavier Deglise, Nancy; Georges Meunier, Nice; Philippe Schlicklin, Nancy, all of France

[73] Assignee: Tunzini-Nessi Entreprises d'Equipements, France

[21] Appl. No.: 549,514

[22] Filed: Nov. 7, 1983

[30] Foreign Application Priority Data

Nov. 5, 1982 [FR] France ................................ 82 18735

[51] Int. Cl.⁴ .......................... C10B 49/22; C10J 3/54
[52] U.S. Cl. ...................................... 48/209; 201/2.5; 201/12; 201/31
[58] Field of Search ................... 48/111, 209, 76, 203, 48/DIG. 1; 201/12, 16, 31, 4, 28, 29, 2.5; 208/8 R; 585/240; 202/99, 108, 109, 112, 120, 121, 215

[56] References Cited

U.S. PATENT DOCUMENTS

| | | | |
|---|---|---|---|
| 3,148,227 | 9/1964 | Hearon et al. ........................ 48/209 |
| 3,853,498 | 12/1974 | Bailie .................................... 48/209 |
| 4,157,245 | 6/1979 | Mitchell et al. .................. 201/12 X |
| 4,183,800 | 1/1980 | Mitchell et al. ..................... 208/8 R |
| 4,230,602 | 10/1980 | Bowen et al. ..................... 48/209 X |
| 4,243,510 | 1/1981 | Dhondt .............................. 201/28 X |
| 4,320,795 | 3/1982 | Gwyn et al. ....................... 201/12 X |
| 4,402,823 | 9/1983 | Bertelsen .......................... 201/31 X |

FOREIGN PATENT DOCUMENTS 2436954  4/1980  France .

*Primary Examiner*—Jay H. Woo
*Assistant Examiner*—Joye L. Woodard
*Attorney, Agent, or Firm*—Sughrue, Mion, Zinn, Macpeak, and Seas

[57] ABSTRACT

The rapid pyrolysis of lignocellulosic products, especially forest waste, is conducted in a fluidized bed of hot refractory particles. The pyrolysis products, comprising solid carbonaceous residue (i.e., char), tars and gas, escape from the bed and cross an overheating zone comprising a packed bed contactor supplied by a rainfall of hot refractory particles. The carbonaceous solid residue is then separated from the produced gases, a portion of which is recycled to fluidize the bed, and burned in a conveyed bed combustion reactor, thus heating the refractory particles that supply the packed bed contactor and the fluidized bed.

5 Claims, 1 Drawing Figure

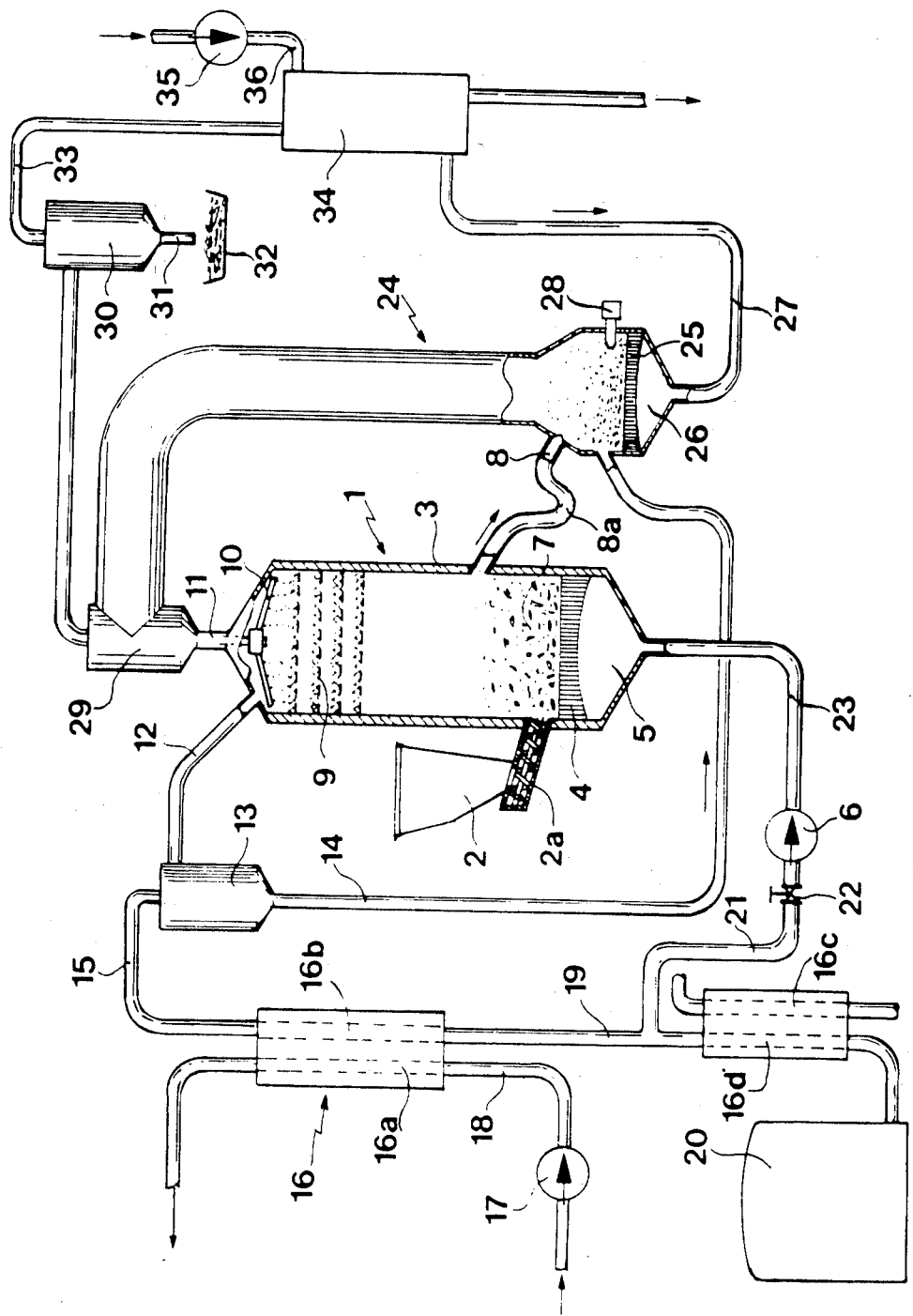

GASIFICATION METHOD AND APPARATUS FOR LIGNOCELLULOSIC PRODUCTS

BACKGROUND OF THE INVENTION

This invention pertains to a method and apparatus for the rapid pyrolysis of lignocellulosic products, especially forest waste.

In the wood transformation industry, wastes comprised of bark, shavings, sawdust and stumps constitute up to 16% in weight of the usable wood. In view of the increase in energy costs, it has become feasible to recover energy contained in that waste.

The most widespread means of energy recovery is combustion of such waste in boilers. Steam is thus obtained which is either used for heating or for producing electricity. But this solution displays some disadvantages. The boiler must be adapted to the efficient combustion of the waste, the hearths are sizeable and the boilers are large. The thermal power generated by these boilers is extremely difficult to modulate or control, which leads to a lack of flexibility which does not make it possible to adapt this power to instant consumer needs that fluctuate most of the time. Finally, the smoke must be treated prior to its ejection into the atmosphere, which leads to the installing of often costly purification devices.

Another more recently evolved means of energy recovery is the gasification of waste. Gas produced by this method net caloric values of about only 1,000 to 3,000 Kcal/Stdm$^3$, however, as a result of dilution by carbon dioxide and/or nitrogen, and this gas is thus better suited to organic synthesis uses due to its hydrogen and carbon monoxide contents. Furthermore, the gas generators which are currently used for gasification are complicated by the fact that the transformation of solid fuel into gas under the action of air or oxygen and ultimately of water vapor most often takes place at the same time as pyrolysis whereas, in order to produce perfectly purified gas, it should only take place after pyrolysis and the break-up of pyrolysis products. Hence, the incompletely transformed products pollute the gas which is obtained and make it unsuitable for direct use without special treatment.

SUMMARY OF THE INVENTION

The invention thus pertains to a rapid pyrolysis method protected from air for lignocellulosic products, which avoids the above disadvantages and provides a rich, clean gas with relatively high net caloric value between 4,000 and 5,000 Kcal/Stdm$^3$, representing an excellent source of energy which can be conveniently distributed.

According to the method of the invention, a rapid pyrolysis is conducted away from air for lignocellulosic products, which are in small size fragments, inside a fluidized bed of hot refractory particles that constitute a heating environment. Pyrolysis products, which comprise a solid carbonaceous residue (char), tars and gas escape from the fluidized bed and cross an overheating zone which is made of a multistage packed bed contactor that is supplied by a rainfall of hot refractory particles, which provide their heating energy to the bed. During the crossing of the overheating zone, the tar which is contained in the gases is cracked into gaseous fractions.

The solid carbonaceous residue is then separated from the gases that are produced, which in part are recycled to fluidize the bed, and in part are directed towards use. This residue mixed with the fluidized bed overflow, which overflow also contains solid carbonaceous residue, is burned inside a conveyed bed, which heats the refractory particles that supply the packed bed contactor and the fluidized bed. A purified gas with high heating power is thus obtained which can be easily distributed to users.

The gases which are produced, after having been separated from the solid carbonaceous residue, can be cooled in order to recover a portion of their sensitive heat that will be used, if necessary, for drying lignocellulosic products prior to their introduction into the fluidized bed.

The smoke from the combustion of solid carbonaceous residue in the conveyed bed can be used to preheat combustion air from that residue.

BRIEF DESCRIPTION OF THE DRAWINGS

The invention will be described in greater detail by referring to the single FIGURE, which is a schematic illustration of an apparatus for the gasification of lignocellulosic products according to the invention.

DETAILED DESCRIPTION OF THE PREFERRED EMBODIMENT

The lignocellulosic products in the form of small size fragments are introduced inside a pyrolysis reactor 1 by a supply hopper 2 equipped with a sieve and a screw conveyor 2a. The pyrolysis reactor is analogous to that described in French Pat. No. 2,436,954. It includes a cylindrical column 3 fitted with refractory bricks, and at its lower part has a fluidizing grate 4 below which there is a plenum 5 supplied with fluidizing gas by a compressor 6.

The grate 4 supports a bed 7 of hot fluidized particles. of which the surplus is evacuated by a lateral overflow pipe 8 equipped with a trap or seal 8a.

The upper part of the column includes a hot refractory particle rainfall packed bed contactor 9 having four levels, each comprised of a wide mesh grating with a 93% opening which supports a packed bed of refractory steel Pall rings with 94% porosity.

A rotating refractory particle distributor 10 distributes particles over the entire surface of the highest level. The particles are conveyed into the distributor 10 through a channel 11.

The column includes above the highest level a discharge duct 12 for gases that are produced which leads the latter to a gas-solids separator 13 equipped with two pipes: one 14 for discharging picked-up solid products, the other 15 which leads the purified gases to an air-gas exchanger 16. A compressor 17 supplies one of the exchanger circuits 16a with cooling air through a duct 18.

The other exchanger circuit 16b is connected by a duct 19 to a storage structure 20 for produced gases. A branch channel 21 of the duct 19 is equipped with a flow adjustment valve 22 which enables the recycling of a portion of the gases that are produced by way of the compressor 6 which is connected to the plenum 5 of the pyrolysis machine through a duct 23.

A second exchanger 16c–16d is set up on the duct 19, between the juncture of the duct 21 and the storage structure 20.

A combustion reactor 24 with a heat conveying bed, which is adjacent to the pyrolysis reactor 1, is connected to it by the lateral overflow pipe 8 of the fluidized bed 7. At its lower part, below the overflow pipe, is a fluidizing grate 25 below which is a plenum 26 supplied by a channel 27. A preheating burner 28 is located above the grate 25 in the lateral wall of the reactor 24. The discharge piping 14 of the gas-solids separator 13 is connected to the reactor 24 and leads the picked-up solid products into it above the fluidizing grate, where they are mixed with refractory particles and some solid carbonaceous residue coming from the overflow pipe 8 connected to the fluidized bed 7.

The combustion reactor 24 ends at its upper part with a gas-solids separator 29 of which the lower part communicates with the supply duct 11 of the rotating solid particle distributor 10. A second gas-solids separator 30 is connected to the upper portion of the initial separator 29. It includes two ducts: a lower one 31 which leads to an ash tray 32, and an upper one 33 connected to a smoke-air exchanger 34.

A compressor 35 supplies the exchanger 34 with fresh air through a piping 36. The piping 27, of which one end leads into the plenum 26 of the combustion reactor 24, is connected to the air side exit of the exchanger 34.

The rapid pyrolysis method for lignocellulosic products works at a constant pace according to the following scheme:

Lignocellulosic products, in the form of small size fragments, are introduced by the supply hopper 2 into the heating environment of the fluidized bed 7 of refractory particles, the temperature of which ranges from 700° to 900° C., where they are pyrolyzed in the absence of air. The pyrolysis products, a solid carbonaceous residue and lignocellulosic products which are not completely pyrolyzed, tars and gases are driven toward the top of the pyrolysis reactor 1 by fluidizing gas whose speed is about 3 m/sec. They cross the overheating zone 9, where the tar is cracked into lighter fractions, and they exit the pyrolysis reactor at a temperature of about 800° C. by way of the duct 12 which directs them into the gas-solids separator 13. The gas, which is rid of solid products, reaches the exchanger 16 from which it exits at a temperature of about 300° C. The cooling air for the gases exits from the exchanger 16 at about 600° C., and can be used for the prior drying of lignocellulosic waste before it is introduced into the pyrolysis reactor 1.

A portion of the cooled gas is recycled by the compressor 6, the valve 22, and the channels 21 and 23 into the plenum 5 of the pyrolysis reactor 1 for fluidizing the bed 7.

The other portion of the gas is cooled a second time in the exchanger 16c-16d down to a temperature of about 40° C. in order to condense most of the water that it contains, whereafter it reaches the storage structure 20 by way of the duct 19.

The combustion reactor 24 is used to heat the refractory particles which supply the packed bed contactor 9 and the fluidized bed 7, through the combustion of solid matter produced during pyrolysis of lignocellulosic products in the reactor 1. These solid substances, which are picked up in the gas-solids separator 13 and in the overflow from the fluidized bed 7 and comprise a carbonaceous residue that is analogous to wood charcoal and lignocellulosic substances which have not been completely transformed, are conveyed into the reactor 24, above the grate 25, by the piping 14. The surplus refractory particles in the fluidized bed 7 as well as the largest particles of solid carbonaceous residue which have not been driven by the fluidizing gas are transferred from the pyrolysis reactor 1 to the combustion reactor 24 by way of the overflow pipe 8. Finally, the air for the combustion and conveyance of the bed is supplied by the piping 27 that leads into the plenum 26.

The temperatures are about 955° C. in the lower or bed part of the combustion reactor 24, and about 950° C. in the upper part of the reactor. The speed of the smoke that is produced from combustion equals about 10 m/sec.

Combustion smoke stemming from the reactor 24 flows through an initial smoke-solids separator 29 that rids them of reheated refractory particles, which are directed towards the rotating distributor 10 by way of the duct 11. A second gas-solids separator 30, which is placed after the initial separator 29, picks up the ashes that are produced from combustion of the carbonaceous residue and of lignocellulosic substances which have not been completely transformed, from which they are discharged into the ash tray 32.

The purified combustion smoke releases its thermal energy into the combustion air of the reactor 24 through the smoke-air exchanger 34 which is supplied with fresh air by the compressor 35. Preheated air is taken into the combustion reactor 24 by the piping 27. Combustion smoke temperatures are about 900° C. at the input and 100° C. at the output of the exchanger 34. The combustion air temperature equals 680° C. in the plenum 26.

When the facility is started up, the refractory particles are heated in the combustion reactor 24 by the burner 28 in order to raise them to a sufficient temperature which will allow for pyrolysis in the pyrolysis reactor 1.

The following example illustrates the invention without restricting its range:

OPERATING CONDITIONS FOR THE PYROLYSIS REACTOR 1

Temperature of the fluidized bed: 800° C.
Speed of gases above the bed: 3 m/sec.
Flow of refractory particles which supply the lining exchange and the fluidized bed: 20 kg/sec.
Flow of fluidizing gas: 0.18 kg/sec.
Temperature of the fluidizing gas: 300° C.

OPERATING CONDITIONS OF THE COMBUSTION REACTOR 24

Temperature in the lower part of the reactor: 955° C.
Temperature in the upper part of the reactor: 950° C.
Speed of combustion smoke in the reactor: 10 m/sec.
Flow of combustion air: 2.74 kg/sec.
Temperature of combustion air at the reactor plenum input: 680° C.

With regard to the operating conditions which have just been mentioned, the following results were obtained:

Flow of lignocellulosic products introduced into the gasification reactor: 1.40 kg/sec. (1 kg/sec. dry products + 0.4 kg/sec. of moisture).
Flow of wet gas available as an energy source: 1.188 kg/sec.
Weight composition of the wet gas:
  $CO$: 37.5%
  $CO_2$: 6%
  $H_2$: 1%
  $CH_4$: 6.2%
  $C_2H_4$: 5%

C2H6: 0.3%
C2H2: 0.7%
H2O: 43.3%

Net caloric value (NCV) of the dry gas that is produced: 4300 Kcal/Stdm$^3$

The advantages displayed by the method which is the subject of the invention are as follows:

Obtaining a high energy gas with high caloric value (NCV between 4000 and 5000 Kcal/stdm$^3$).

The yield, which is defined as the ratio of energy content in the products supplied through pyrolysis and energy content of lignocellulosic products introduced into the pyrolysis reactor, can reach 70% in practice, a figure which is sharply higher than those for gasification with air or oxygen.

The system is self-regulating and will find a balance for stable operation. For instance, if the pyrolysis temperature is too low, the proportion of carbonaceous residue increases and through its combustion the temperature of the refractory particles that exit from the combustion reactor increases, which raises the temperature of the fluidized bed of the pyrolysis reactor. In the event that the pyrolysis temperature is too high, the proportion of solid carburetted residue drops, which leads to a drop in temperature of the refractory particles which exit from the combustion reactor and, subsequently, the temperature of the fluidized bed of the pyrolysis reactor drops.

The method prevents the mixing of gases produced in the pyrolysis machine with combustion air and smoke from the combustion reactor.

The method might treat all categories of lignocellulosic waste after reduction into small size fragments, which makes it possible to use wood that is not suited for the paper industry and especially barks for which there are few applications.

The method also makes it possible to treat agricultural waste such as hay, corn cobs, etc. and forest waste such as copse wood.

The method allows for imported energy savings (oil, gas) through the production of gas with a NCV such that it is suited for many thermal uses.

As a variation, the fluidizing of the bed 7 of the pyrolysis machine 1 can be ensured with steam from overheated water.

What is claimed is:

1. A rapid pyrolysis method for lignocellulosic products in small size fragments in which the lignocellulosic products are introduced into a fluidized bed of hot refractory particles which constitutes a heating environment which transforms them into pyrolysis products comprised of gas, tar and a solid carbonaceous residue, the heating energy necessary for pyrolysis being supplied through combustion of the solid carbonaceous residue, comprising the steps of:
   providing an overheating zone, comprised of a packed bed contactor supplied by a rainfall of hot refractory particles, said contactor being above but separated from the fluidized bed;
   passing the pyrolysis products formed in said fluidized bed upwardly through said overheating zone to crack the tar into gaseous fractions;
   separating the solid carbonaceous residue from the gaseous pyrolysis products;
   conveying said separated solid carbonaceous residue separated from the gaseous pyrolysis products to a combustion reactor, providing an overflow from the fluidized bed to the combustion reactor to carry surplus refractory particles and the portion of the solid carbonaceous residue which has not been carried with the pyrolysis products upwardly through the overheating zone to the combustion reactor; and
   burning the solid carbonaceous residue in said combustion reactor to heat the refractory particles therein, and supplying said heated refractory particles to the fluidized bed through the packed bed contactor.

2. A method according to claim 1, wherein the speed of gases between the fluidized bed and the overheating zone is between 2.5 and 3.5 meters per second.

3. A method according to claim 2, wherein the speed of smoke produced by the combustion of the solid carbonaceous residue inside the combustion reactor is between 9 and 11 meters per second.

4. A method according to claim 3, wherein the temperature of combustion smoke inside the combustion reactor is between 900° and 980° C.

5. A method according to claim 4, wherein the gas which is produced possesses heating power in a range from 4000 to 5000 Kcal/Stdm$^3$.

* * * * *